(12) United States Patent  (10) Patent No.: US 7,464,990 B2
Collias  (45) Date of Patent: Dec. 16, 2008

(54) CHILD SAFETY SEAT SUPPORT APPARATUS

(75) Inventor: Constantine Dean Paul Collias, Kings Mountain, NC (US)

(73) Assignee: Crown Village, LLC, Kings Mountain, NC (US)

( * ) Notice: Subject to any disclaimer, the term of this patent is extended or adjusted under 35 U.S.C. 154(b) by 614 days.

(21) Appl. No.: 10/892,703

(22) Filed: Jul. 15, 2004

(65) Prior Publication Data

US 2006/0012234 A1    Jan. 19, 2006

(51) Int. Cl.
A47D 1/10    (2006.01)

(52) U.S. Cl. .................... 297/256.16; 297/423.38; 297/423.4

(58) Field of Classification Search ............. 297/256.16
See application file for complete search history.

(56) References Cited

U.S. PATENT DOCUMENTS

| 1,501,443 | A |   | 7/1924  | Ellis |
|---|---|---|---|---|
| 1,688,225 | A |   | 10/1928 | Belohlavek |
| 2,308,315 | A |   | 1/1943  | Smith |
| 2,777,502 | A |   | 1/1957  | Travis |
| 3,207,552 | A |   | 9/1965  | Loughney, Jr. |
| D264,788  | S |   | 6/1982  | Blanchard |
| 4,728,151 | A |   | 3/1988  | Neufeld |
| 4,874,203 | A |   | 10/1989 | Henley |
| 5,228,745 | A |   | 7/1993  | Hazel |
| D341,969  | S |   | 12/1993 | Hazelton Kroah |
| 5,332,292 | A |   | 7/1994  | Price et al. |
| 5,385,385 | A |   | 1/1995  | Silverman |
| 5,395,157 | A |   | 3/1995  | Rollo et al. |
| 5,820,215 | A | * | 10/1998 | Dreisbach ............... 297/256.16 |
| 5,829,834 | A |   | 11/1998 | Silverman |
| 5,997,085 | A |   | 12/1999 | MacLiver |
| 6,170,911 | B1 |   | 1/2001  | Kassai et al. |
| 6,264,278 | B1 |   | 7/2001  | Weimer et al. |
| 6,267,441 | B1 |   | 7/2001  | Otero |
| 6,336,682 | B1 |   | 1/2002  | Rosko |
| 6,474,744 | B1 | * | 11/2002 | Taylor et al. ......... 297/344.18 X |
| 6,796,606 | B2 | * | 9/2004  | Marshall ................ 297/256.16 |
| 6,860,557 | B2 | * | 3/2005  | Jonasson ............ 297/256.16 X |

FOREIGN PATENT DOCUMENTS

| DE | 4137599 A1 | * | 5/1993 |
|---|---|---|---|
| WO | WO 03/055717 A1 |   | 7/2003 |

* cited by examiner

*Primary Examiner*—Anthony D. Barfield
(74) *Attorney, Agent, or Firm*—Summa, Additon & Ashe, P.A.

(57) ABSTRACT

The invention is a support apparatus for a child's safety seat. The support apparatus allows the user to adjust the tilt of a child safety seat while maintaining a child in a safe position. The support apparatus comprises a base portion, an upper portion connected to one end of the base portion, and a bottom portion connected to an opposite end of the base portion. The upper and bottom portions may be attached to the base by adjustable hinges, or they may be attached in a fixed position. A foot support is attached to the bottom portion. The bottom portion engages the floor of a vehicle for added support. A child safety seat adapted to receive the invention is also disclosed.

39 Claims, 6 Drawing Sheets

CHILD SAFETY SEAT SUPPORT APPARATUS

FIELD OF THE INVENTION

The present invention relates to a child safety seat support apparatus. The invention particularly relates to an apparatus for enhancing the safety and comfort of a child positioned in a safety seat.

BACKGROUND

Almost all modes of transportation include seats for drivers or passengers. Most vehicle seats include a horizontal section for supporting an occupant's lower back and upper legs. A substantially vertical portion supports the occupant's back. Seats that are used in cars, trucks, and airplanes also typically include a restraint system (e.g., seat belts) to secure the occupant during rapid deceleration (i.e., collision).

The majority of seats found in cars, trucks, and airplanes are designed for adult passengers. These seats are unsuitable and unsafe for infants and small children. Accordingly, most, if not all states, have passed laws requiring transport of children in seats designed specifically for infants and children. This legal requirement has expanded the market for children's car seats.

Children's car seats typically are of three types, although there are numerous variations of each. The first is the infant car seat. Infant car seats are cradle-like structures that rest on the lower portion of the seat. Infant car seats are usually designed as inserts that can be easily removed from the car without removing the child from the car seat. Infant car seats are held in place by the car's seat belt system or by an anchor system installed in the vehicle seat. Infant car seats have a self-contained restraint system that secures the infant into the seat. Children up to about twenty pounds sit in an infant seat that is usually installed so that the child faces the rear of the car.

The second kind of child safety seat is the forward facing seat that holds children that weigh between about twenty and forty pounds. This seat is also held in place by the vehicle's seat belt system or possibly by anchors that are installed within the vehicle seat.

The third kind of car seat is the booster seat. This type of seat is designed for children that are too large for other safety seats but are not big enough to safely sit in a standard vehicle seat without extra support. A booster seat is typically formed in the shape of a small seat with a lower portion that is generally parallel to the lower portion of the underlying seat and a back support that is generally parallel to the back support of the underlying seat. The booster seat lifts the child up and away from the underlying seat to a position where the child can be safely restrained by the car's seat belt system. The booster seat may or may not be attached to the underlying seat. Booster seats hold children that typically weigh between forty and eighty pounds.

One problem that exists with child safety seats is that current designs tend to have the child sitting in an upright position where the child's back is close to vertical. Although an upright position can be beneficial in many ways, children often fall asleep during car trips. If the child's back is close to vertical and the child falls asleep, the child's head may fall forward and restrict the child's airway.

Another problem that exists with child safety seats is that current designs lack adequate adjustable foot support. This results in discomfort and possible loss of blood circulation in the child's legs on long automobile trips.

For example, U.S. Pat. No. 2,308,315 to Smith discusses a booster type car seat for a child. The seat includes a padded seat portion, an adjustable back rest, and an adjustable foot rest. The back rest and the foot rest may be adjusted to place the child in a reclined position.

Although the Smith seat is capable of placing a child in a reclined position and provides a foot rest, Smith fails to disclose a brace member extending from the foot rest to the floor of the automobile. The Smith seat, therefore, has no support on the bottom.

Another example is U.S. Pat. No. 4,874,203 to Henley. The Henley '203 patent discusses a vehicle passenger seat for handicapped persons. The embodiments shown in the patent are primarily designed for adults. The seats comprise a rigid seat and back portion with an adjustable foot rest extending from the seat portion. The seats discussed in Henley are rigid in nature and cannot be reclined. Furthermore, the adjustable foot rest is not described as reaching the floor to provide a point of support for the seat.

Yet another example is U.S. Pat. No. 5,228,745 to Hazel. The Hazel '745 patent discusses an insert for a child or infant car seat having a back portion, a seat portion and a leg portion. The back portion and the seat portion may be hinged together or rigidly joined. The seat portion and the leg portion, however, are rigidly fixed in each embodiment. The leg portion is not designed to reach all the way to the floor of a vehicle or provide support for the seat and back portions.

U.S. Pat. No. 6,264,278 to Weimer, et al. is directed to an adjustable foot rest for a car seat. The foot rest is preferably attached to a child's car seat via a hinge. The foot rest includes a vertical plate depending from the hinge and a second plate attached to the vertical plate via a dowel structure. A third plate upon which a child's feet rest is attached to the second plate. The dowel structure slides up and down the vertical plate and is secured by placing the dowel in various holes along the length of the vertical plate. The Weimer foot rest is not designed to make contact with the floor of a vehicle or provide an additional means of support for the child seat. Likewise, the Weimer foot rest is incapable of providing the means to adjust the angle of the car seat's backrest.

Along these lines, U.S. Pat. No. 6,170,911 to Kassai is directed to an infant's car seat or a seat for a very small child. The seat includes an upper base section and a lower base section with an adjustment means connecting the two sections. The adjustment means is designed to change the angle of inclination of a car seat and the child within the seat. The seat is designed to allow the positioning of a child in a substantially horizontal orientation. Although the Kassai seat provides for the horizontal positioning of a child, thus preventing the child's head from falling forward during sleep, the Kassai seat is directed toward infants and very small children. The Kassai seat fails to disclose any means of foot support that would be necessary or desirable for an older child. Likewise, the Kassai seat fails to disclose or suggest the use of a foot support as means of providing support or adjustment of a car seat.

Yet another example is U.S. Pat. No. 6,336,682 to Rosko. The Rosko '682 patent is directed to a child vehicle seat with a shoulder strap guide. The seat includes a molded plastic seat shell formed to include a seat portion having a back edge and a back support portion coupled thereto. The back support portion has a unshaped perimeter and a plurality of tabs extending from an outer leg of the unshaped perimeter. The tabs cooperate with the perimeter to form channels adapted to receive a shoulder portion of a seat belt. The Rosko '682 patent fails to teach or suggest, however, the use of a foot support as a mechanism for providing support or adjustment of a car seat.

U.S. Pat. No. 5,997,085 to MacLiver also discloses a child's safety seat, particularly for accommodating more than one child. The seat can be provided with a back portion and a base portion which are sub-divided to provide a plurality of individual seats. The seat may be provided with adjustable support legs that bear down on the inner sills of a motor vehicle to provide additional rigidity and support. The MacLiver '085 patent further provides a rearward-facing seat in a semi-reclined position for small children. The MacLiver '085 patent fails to teach, however, the adjustability of the seat portion to a reclining position for a larger child. The MacLiver '085 patent also fails to teach or suggest the use of a foot rest.

A review of child safety seat technology shows that a need exists for an apparatus that would allow a child to recline more comfortably in a safety seat. A further need exists for an apparatus that safely restrains a child in a safety seat while providing a foot support to prevent a child's legs from dangling downward for prolonged periods of riding.

SUMMARY OF THE INVENTION

The invention is a support apparatus for a child's safety seat. The support apparatus includes a base portion, an upper portion connected to one end of the base portion, and a bottom portion connected to an opposite end of the base portion. The upper and bottom portions may be attached to the base by adjustable hinges, or they may be attached in a fixed position. A foot support is attached to the bottom portion.

The bottom portion serves as a platform for the foot rest and as a supporting element for the child safety seat support apparatus. The bottom portion is designed to be adjustably elongated so that the bottom portion comes into contact with the floor of a vehicle. The bottom portion preferably engages the vehicle floor at an angle, creating a horizontal force vector that aids in prevention of forward movement of the support apparatus.

The bottom portion is also designed to provide a degree of rigidity sufficient to produce a stable upward force vector. In this manner, the child safety seat support apparatus aids in tilting an associated car seat, specifically the back portion of the car seat, to an inclined position. This position prevents a child's head from falling forward when asleep. In one embodiment, the bottom portion is removable for convenient storage.

Thus, it is an object of the present invention to provide a child safety seat support apparatus having an upper portion adjustably connected to a base portion to recline a child safety seat in a safer, more comfortable position during automobile travel.

It is further an object of the present invention to provide a child safety seat support apparatus having a bottom portion adjustably extending from the base portion to the floor of a motor vehicle for increased rigidity, support, and comfort.

It is further an object of the present invention to provide a child safety seat support apparatus having an adjustable foot rest to enhance the child's comfort during automobile travel.

It is further an object of the present invention to provide a child safety seat support apparatus that may be used in conjunction with standard car seats to aid in positioning the car seats during use. These car seats include various extra features, such as the five point harness for holding children securely therein.

DETAILED DESCRIPTION

The invention is a child safety seat support apparatus for positioning a standard child safety seat (hereinafter "safety seat") on a vehicle seat.

As used herein, a vehicle includes all forms of transportation in which passengers may attach child safety seats to secure children while moving. Pursuant to this invention, a "safety seat" includes, but is not limited to, car seats and booster seats that are commonly available on the market today and in the future. The support apparatus is useful for adjusting the position in which a safety seat reclines on a vehicle seat. The support apparatus is adjustable to make a safety seat more comfortable on a wider variety of vehicle seats.

In one aspect, the support apparatus assists in securely tilting a safety seat to allow a sleeping child to remain in a reclined position safely. In vertically oriented safety seats, sleeping children often lean forward, which leads to cramps or even obstructions to breathing. The support apparatus disclosed and claimed herein provides an apparatus for optimally positioning a safety seat on a wide variety of vehicle seats to allow a child to ride more comfortably.

Figure 1:
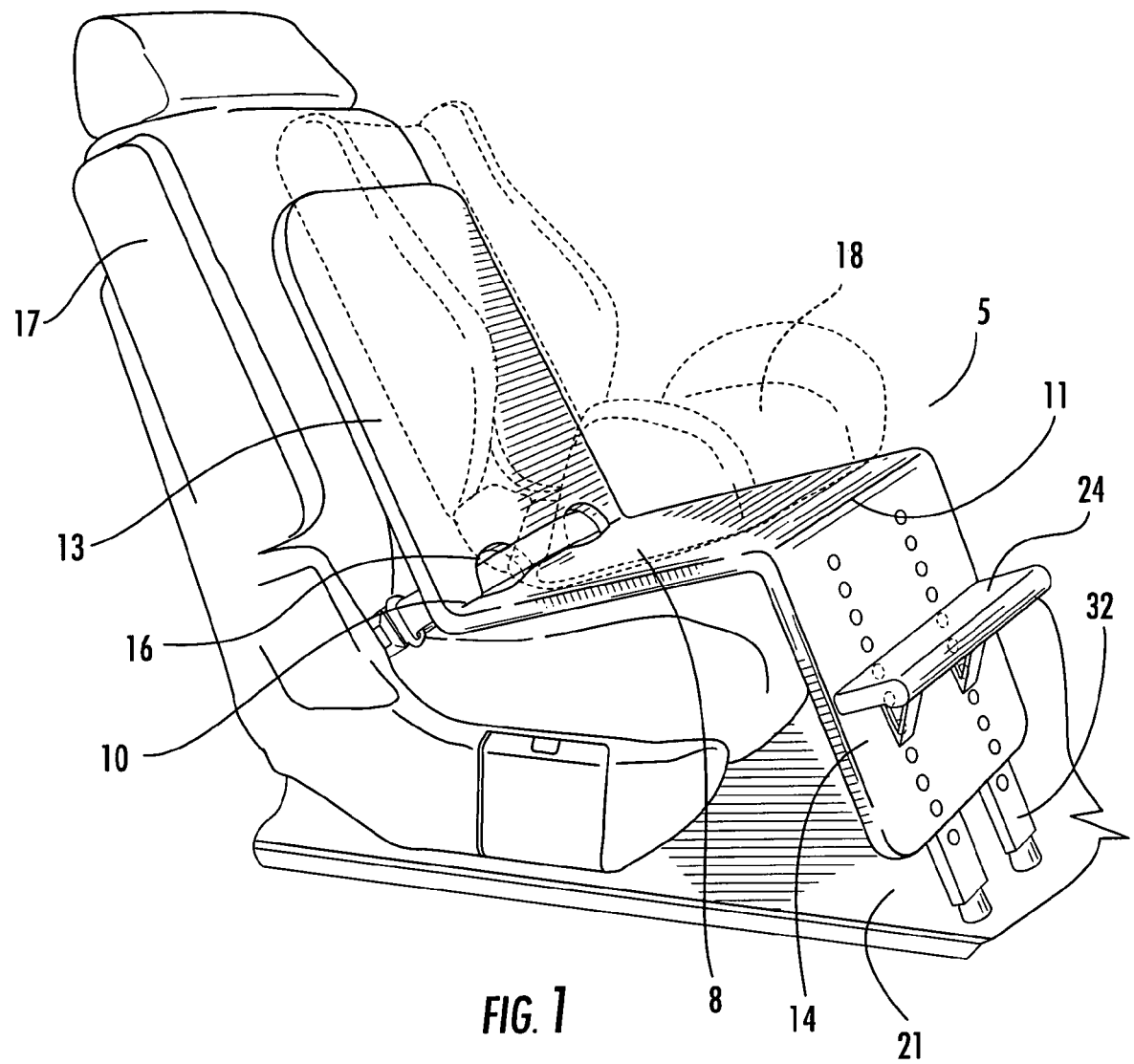
FIG. 1 is a side view of a single piece child safety seat support apparatus installed on a vehicle seat with a child safety seat thereon.

The first embodiment, shown in FIG. 1, is a single piece child safety seat support apparatus 5. The support apparatus has a base portion 8 for placing on the seat 17 of a vehicle and receiving a child safety seat 18 thereon. The base portion 8 has a first end 10 and a second end 11. An upper portion 13 is connected to the first end 10 and extends upward at an angle relative to the base portion 8. A bottom portion 14 is connected to the second end 11 of the base portion 8. The bottom portion 14 extends downward at an angle relative to the base portion 8 and engages the floor 21 of the vehicle. A foot rest 24 extends from the bottom portion 14. The apparatus 5 may include anchor receptacles 16 as necessary to allow a seat belt or a safety seat anchor to hold the support apparatus 5 and a safety seat 18 in place. The anchor receptacles 16 may be formed by contoured openings between the base 8 and the upper portion 13. Instead of contoured openings, the support apparatus may have a latching system that engages anchors installed in the vehicle seats.

The base 8, the upper portion 13, and the bottom portion 14 together adjust the position in which the child safety seat 18 reclines on a vehicle seat 17. The single piece support apparatus 5 is placed on the vehicle seat 17 at a desired angle. A safety seat 18 is placed on top of the support apparatus 5 and will tilt in the direction provided by the support apparatus 5. Typically, the user will position the support apparatus 5 to allow the safety seat 18 to lean back so that a resting child in the safety seat 18 will be in a secure reclined position. Without the support apparatus 5 according to this invention, the back of a standard safety seat would be in a substantially vertical position. A child sleeping in a vertical safety seat will eventually lean forward in an uncomfortable and possibly dangerous position.

The support apparatus 5 of this invention provides a more comfortable and safer tilt to a safety seat 18 thereon. In order to provide this positional enhancement to a standard safety seat, the support apparatus 5 of FIG. 1 has the upper portion 13 connected to the first end 10 at an angle less than about 180 degrees relative to the base 8 (i.e., an upward angle). Similarly, the bottom portion 14 is connected to the second end 11 at an angle between about 180 degrees and about 360 degrees relative to the base 8 (i.e., a downward angle).

The support apparatus 5 according to FIG. 1 also includes a foot rest 24 so that a child in the safety seat can prop up his or her feet and legs. When riding in a safety seat for long periods, a child's dangling legs tend to cramp and become uncomfortable. Children in safety seats often raise their legs and push their feet against the seat in front of them to remedy this design deficiency. The invention herein includes the foot rest 24 to prevent such discomfort and cramping by giving the child an appropriately attached adjustable foot rest to obtain the proper height.

Adjusting the height of the foot rest is a practical concern in using the support apparatus 5 disclosed herein. The support apparatus 5 may be used in a variety of different vehicles, all of which have different seat structures and heights. Also, the child in the seat may be any number heights as well. The support apparatus 5, therefore, includes a mechanism for removably attaching the foot rest to the bottom portion 14.

Figure 2:
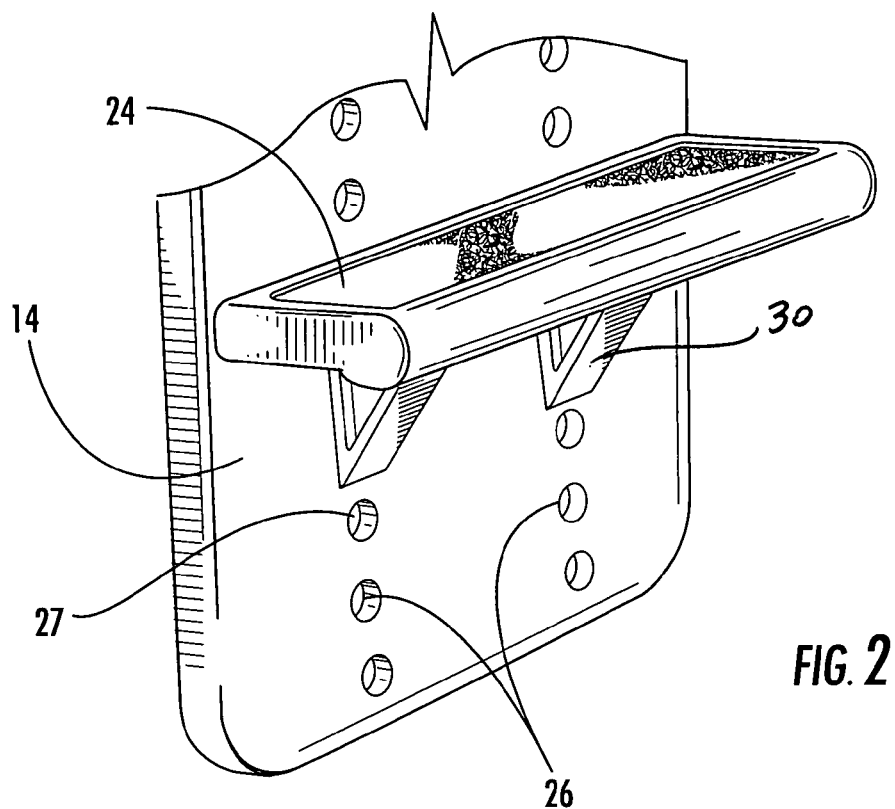
FIG. 2 is a front plan view of a bottom portion of the invented apparatus with a foot rest installed.

Without limiting the invention herein, FIG. 2 shows way of attaching the foot rests. The bottom portion 14 has a plurality of inner edges 26 defining attachment receptacles 27 within the bottom portion 14. The attachment receptacles 27 are vertically spaced from one another to provide a plurality of heights at which the foot rest 24 may be attached. The foot rest 24 may attach to the attachment receptacles 27 by any means. For example, the foot rest 24 may include at least one peg on its outer perimeter to place inside the attachment receptacles 27. Other standard bracketing mechanisms may be used to attached foot rest 24 to the bottom portion 14 as well.

The foot rest 24 may further include a pair of gussets 30 connected under a respective end of the foot rest 24 to support the foot rest 24 against the bottom portion 14. A gusset fastener, such as the above described peg, may be used to engage at least one of the attachment receptacles 27.

The support apparatus 5 may be used in a variety of the vehicles for transporting children. The support apparatus 5 may be adjustable to fit on different seats in a wide variety of modes of transportation. As shown in FIG. 1, the support apparatus 5 is a single piece construction. The support apparatus 5 of FIG. 1, therefore, may optionally include an extension device 32 to ensure that the support apparatus 5 will engage the vehicle floor 21. One benefit of the support apparatus according to the invention herein is that the bottom portion 14 engages the vehicle floor 21 and provides an upward vector of force to support the apparatus 5.

The support apparatus 5 includes contours to define anchor points 16 through which a standard seat belt or seat anchor may engage a safety seat 18. In this fashion, the support apparatus 5 is securely held between the vehicle seat 17 and the safety seat 18. The extension device 32 provides an upward vector of force to hold the support apparatus 5 at a desired angle.

The extension device 32 includes a way of making coarse adjustments to the length of the bottom portion 14 of the support apparatus 5. Without limiting the invention herein, the term "coarse adjustment," means changing the position of the extension device 32 in relation to the bottom portion 14 by fixed amounts that are previously set within the structure of the bottom portion. In other words, the invention encompasses a way of shortening or lengthening the extension device 32 in relation to the bottom portion by a primary adjustment mechanism.

Similarly, the term "fine adjustment" means changing the position of the extension device 32 in relation to the bottom portion 14 by smaller and more selective increments than those described as "coarse adjustments". The fine adjustment mechanism is then a secondary way of changing the position of the extension device between the bottom portion 14 and a vehicle floor 21.

Figure 3:
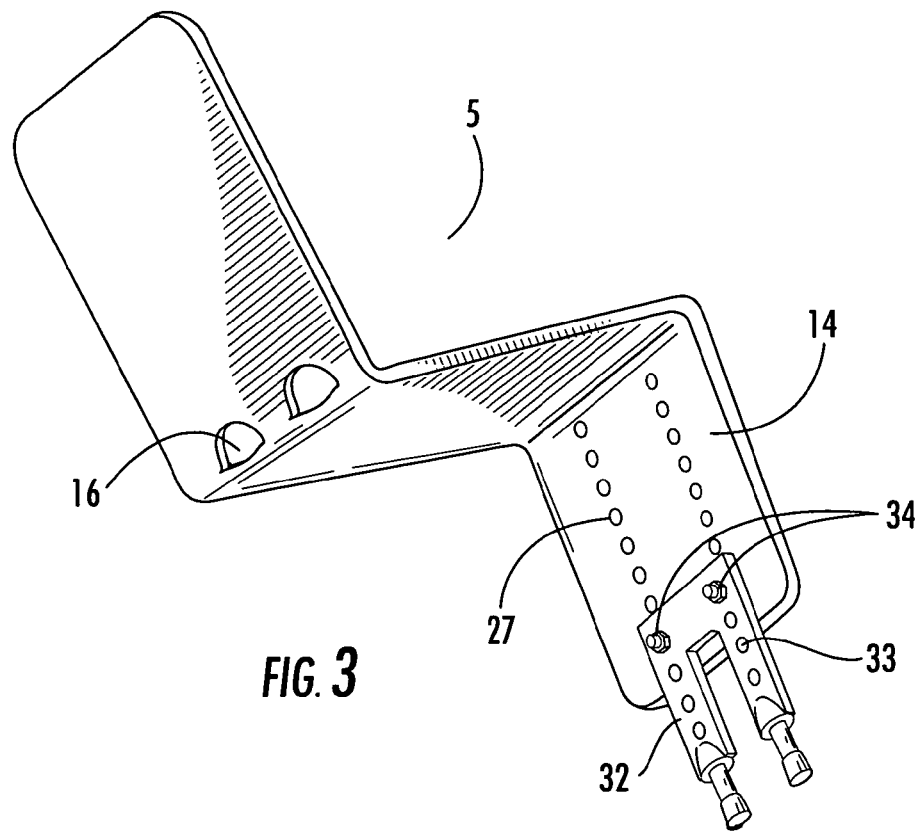
FIG. 3 is a rear view of a single piece support apparatus with an extension device attached to the bottom portion as shown.

FIG. 3 shows one example of an extension device 32 connected to the bottom portion 14 of the apparatus 5. In this example, the extension device 32, includes fastening points 33. The extension device 32 is connected to the backside of the bottom portion 14 by engaging an adjustable fastener 34 between the fastening point 33 and the attachment receptacle 27 of the bottom portion 14. The fastening point on the extension device may be a hole similar to the above described attachment receptacle 27.

The extension device 32, therefore, may be attached at any of the heights provided by the attachment receptacles 27 of the bottom portion 14. The connection between the attachment receptacles 27 and the bracket 34 is one example of a coarse adjustment of the length of the extension device 32. The length of the extension device 32 may be "coarsely adjusted" by selecting an appropriate attachment receptacle 27 to affix the extension device to the bottom portion. The locations of the attachment receptacles 27 have been previously determined and set at fixed heights of the bottom portion.

The arrangement of FIG. 3 is only one example of providing coarse adjustment of the length of the extension device 32. In a different embodiment and without limiting the device herein, the coarse adjustment of the length of the extension mechanism 32 may be accomplished by a ratchet bar on the backside of bottom portion 14 and an engagement pawl on the extension device 32. The ratchet bar may include a plurality of curved receptacles in which the engagement pawl may securely rest at a selected height. The extension device may be moved into a higher or lower receptacle on the bottom portion 14 as desired.

Figure 4:
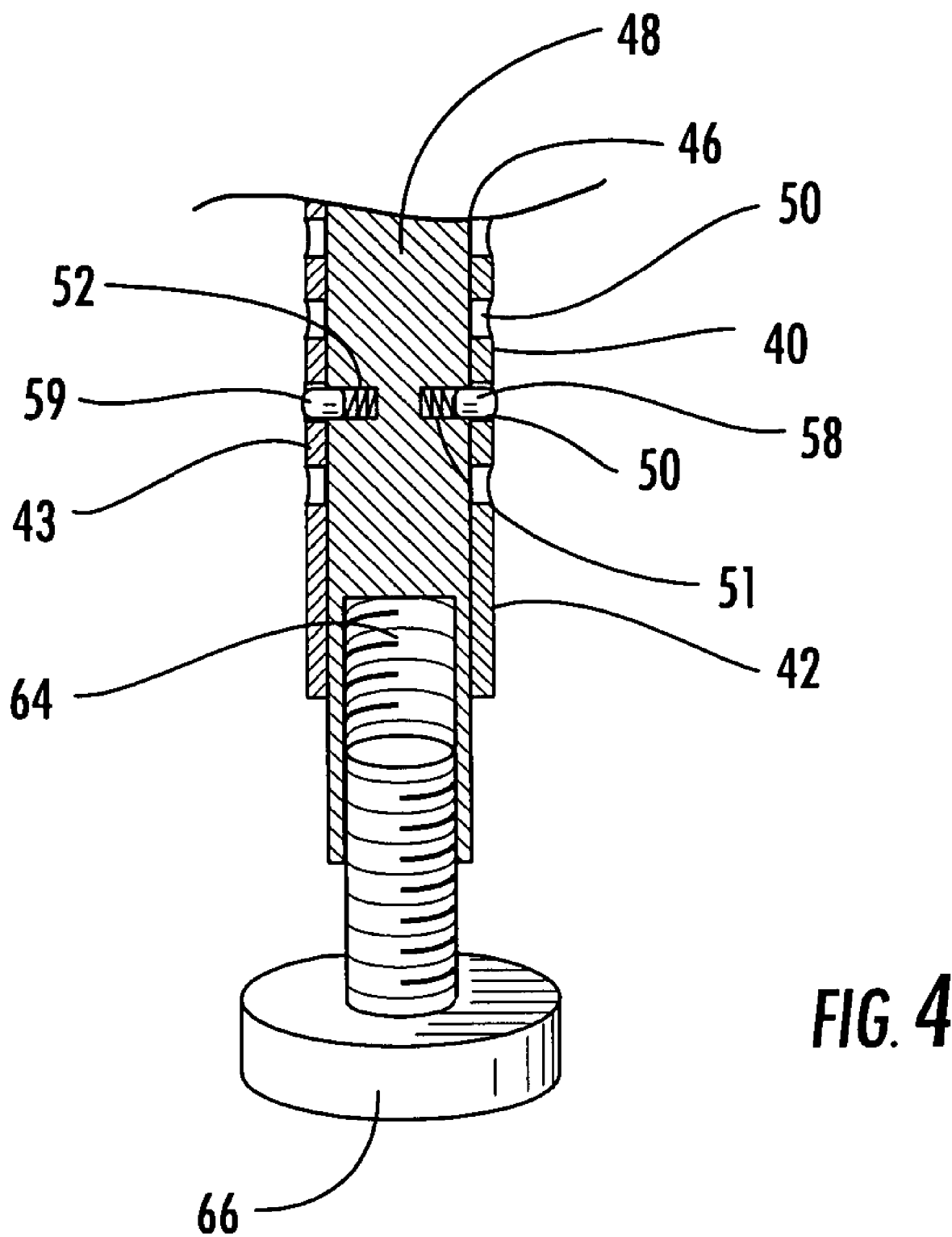
FIG. 4 is a side view of an enclosed cavity of a bottom portion of a child safety seat support apparatus with an extension device placed therein and a length adjustment screw engaging a threading therein.

The bottom portion 14 of the support apparatus 5 may be designed to engage the extension device 32 in other convenient ways. FIG. 4 shows another embodiment of the bottom portion of the apparatus 5. FIG. 4 is a side view of a bottom portion 40 that may be used in the same fashion as the previously discussed bottom portion 14. In FIG. 4, the bottom portion 40 engages an extension device 48 from the inside of the bottom portion 40.

In this embodiment, the bottom portion 40 is a rectangular enclosure with a front face 42 and a rear face 43. The front and rear faces 42, 43 are connected by two side faces, a top face, and a bottom face to define a cavity 46 therein. An extension device 48 slides into the cavity 46 of the bottom portion 40.

The bottom portion 40 of FIG. 4 has a plurality of inner edges 50 defining pairs of coaxial holes 51, 52 in the respective front face 42 and rear face 43. The extension device 48 slides into the cavity 46. The extension device has a pair of coaxial spring pins 58, 59 that releasably engage a selected pair of coaxial holes 51, 52 in the bottom portion 40. The spring pins 58, 59 may be locked in place at a selected height within the bottom portion 40.

The apparatus 5 may also include a way to achieve fine adjustment of the length of the extension device 48. The fine adjustment allows the user to ensure a secure engagement between the extension device 48 and a vehicle floor.

As shown in FIG. 4, the fine adjustment means may include, but is not limited to, a threading 64 within the extension device 48. The threading 64 extends from the bottom of the extension device 48 into the interior of the extension device. A length adjustment screw 66 engages the threading 64 to brace the extension device against a vehicle floor 21. The length adjustment screw 66 may be loosened or tightened as necessary.

The support apparatus shown in FIGS. 1-4 is simple to operate. The user places the single piece support apparatus 5 on a vehicle seat 17. The apparatus 5 may be positioned at an angle as required by the seat design to hold a child safety seat at a desired angle. The extension device 32 or 48 attaches to the apparatus 5 to provide a secure engagement between the bottom portion 14 or 40 of the apparatus 5 and the vehicle floor 21.

Depending on the height of the seat, the extension device 32 or 48 may be connected to the bottom portion 14 at a selected position. The positions available for attaching the extension device provide a mechanism for coarsely adjusting the length of the extension device. A mechanism for fine adjustment of the extension device, such as a length adjustment screw, may be tightened or loosened as necessary to securely engage the vehicle floor 21.

Figure 5:
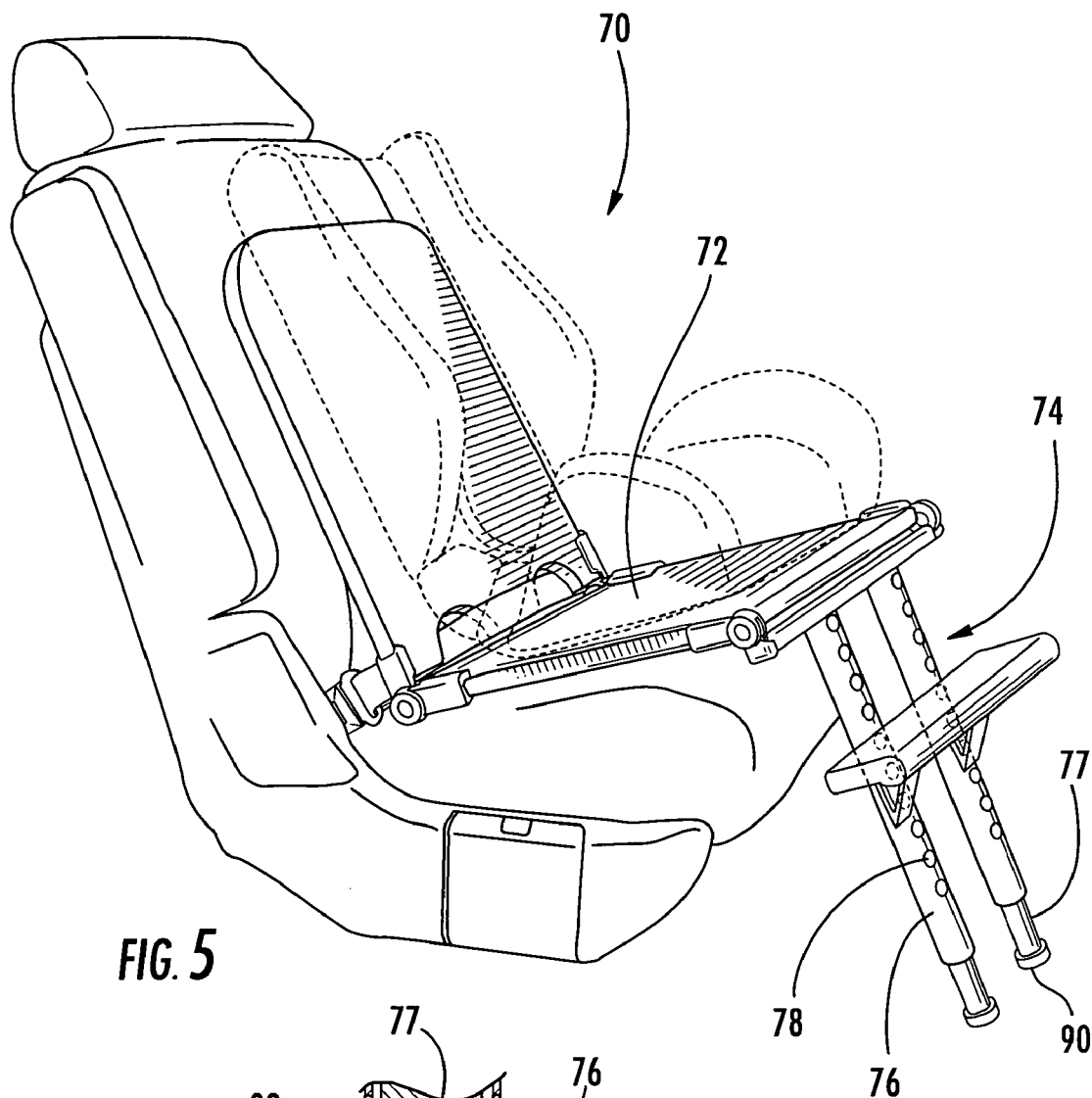
FIG. 5 is a side view of a child safety seat support apparatus with adjustable legs.
Figure 6:
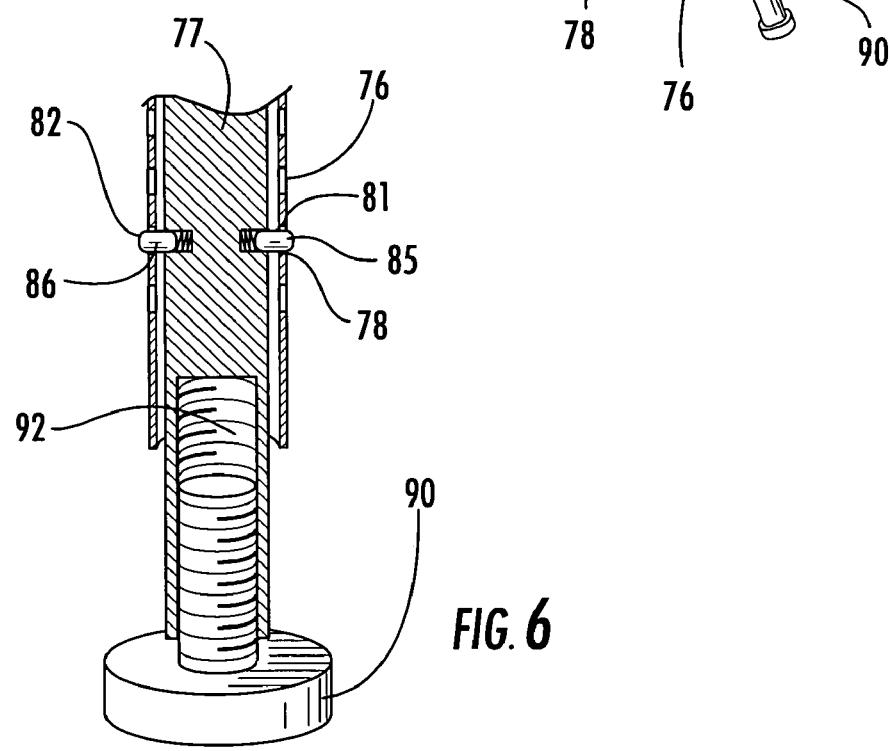
FIG. 6 is a cross section view of one adjustable leg of the bottom portion of a child safety seat support apparatus.

The bottom portion 14 of the apparatus 5 may also be designed as shown in FIG. 5. The bottom portion 74 of FIG. 5 has at least one adjustable leg 76 extending from the base 72 of the support apparatus 70. As shown in FIG. 6, the adjustable leg 76 is hollow to define a cavity therein. An extension device 77 slides into the cavity of the leg 76. In this design, the extension device 77 is a telescoping attachment that slides into the leg 76 and locks into any of several available positions. As used herein, the term "telescoping" means, without limitation, that one part slides into the interior of another part, as in typical telescope designs.

One mechanism for locking the telescoping extension device 77 into the leg 76, is shown in FIG. 6. In FIG. 6, the leg 76 has a plurality of inner edges 78 defining coaxial holes 81, 82 positioned opposite one another. Similar to the embodiment of FIG. 4, the extension device 77 includes a pair of coaxial spring pins 85, 86. The spring pins 85, 86 releasably engage the coaxial holes 81, 82 within the leg 76 to lock the extension device 77 in a selected position. The spring pin and hole configuration is just one example of a mechanism for locking the telescoping extension device 77 in place. Other locking means are within the scope of the invention herein.

As discussed in relation to FIG. 4, a length adjustment screw may be included within the extension device 77 of FIG. 6. The length adjustment screw 90 once again provides a way to tighten the engagement between the extension device 77 and a vehicle floor 21. The extension device 77 includes a threading 92 to receive the length adjustment screw 90.

The support apparatus disclosed and claimed herein allows the user to adjust the tilt at which a child safety seat reclines on the seat of a vehicle. Regardless of the seat design or the height of the seat, the support apparatus allows the user to position a child safety seat as necessary to make the child more comfortable for longer periods of time.

Figure 7:
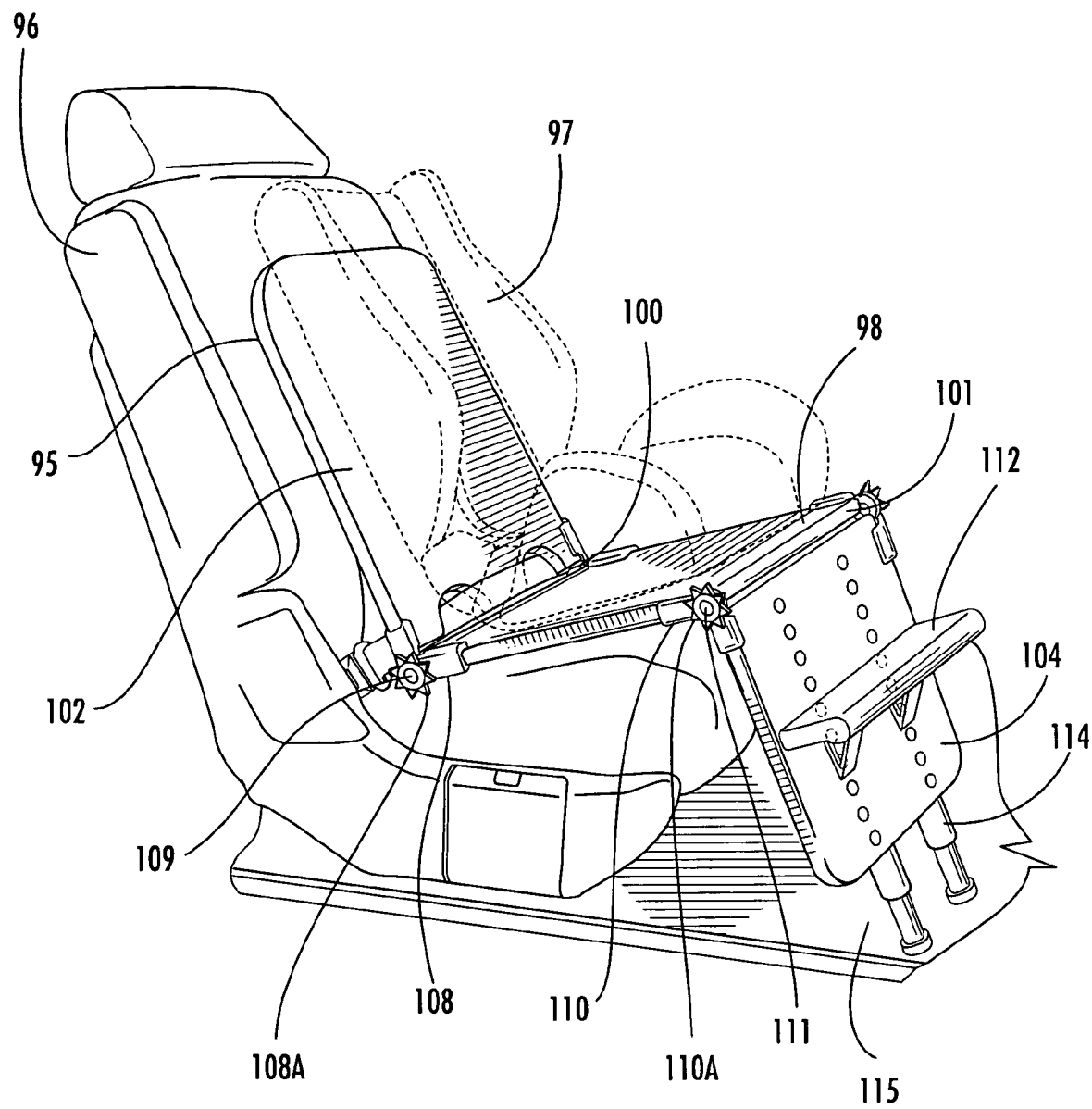
FIG. 7 is a side view of a child safety seat support apparatus with adjustable hinges connecting separable portions of the apparatus.

Another embodiment of this invention provides even more opportunity to adjust the angle at which a child safety seat tilts or reclines. As shown in FIG. 7, the support apparatus may be designed as modular pieces that conveniently fit together. The support apparatus 95 of FIG. 7 includes all of the features shown in FIGS. 1 through 6, except the base portion 98, the upper portion 102, and the bottom portion 104 are separable. As such, the previously described attributes of the support apparatus shown in FIGS. 1-6 will not be repeated but are incorporated herein as if fully set forth.

The support apparatus 95 of FIG. 7 includes an extra functionality in that the base portion 98, the upper portion 102, and the bottom portion 104 are separate pieces. The base portion 98 has a first end 100 and a second end 101. The upper portion 102 is connected to the first end 100 by at least one adjustable rear hinge 108. The upper portion 102 extends upward at an angle relative to the base portion 98. The hinge 108 allows the user to adjust the angle of the upper portion 102.

The bottom portion 104 is connected to the second end 101 of the base 98 by at least one adjustable front hinge 110. The bottom portion 104 extends downward relative to the base portion 98 and engages the floor 115 of a vehicle. A foot rest 112 extends from the bottom portion 104.

The modular design of support apparatus 95 provides even more latitude in positioning a child safety seat 97 on a vehicle seat 96. The front and rear hinges 108 and 110 each include respective retractable pins 109 and 111. The pins 109 and 111 may be removed, allowing the user to separate the base 98 from the upper portion 102 and the bottom portion 104. This is especially useful to remove the bottom portion 104 as necessary to increase cargo space beneath the vehicle seat 96. In fact, after a child safety seat 97 has been installed on the vehicle seat 96 with the support apparatus 95 under the safety seat 97, many users will leave the installation in place for extended periods. The bottom portion 104 may be removed temporarily by unhinging the bottom portion 104 from the base 98.

The adjustable hinges 108 and 110 may be any type of known hinge that is capable of locking at several different positions selected by the user. Typical hinges similar to those used on folding lawn chairs would suffice. The adjustable hinges 108 and 110 each have a plurality of positioning points 108A, 110A. The positioning points 108A and 110A are gear type projections in a ratchet hinge that hold the hinge at a selected position. Each positioning point available with the rear adjustable hinge 108 holds the upper portion 102 at a respective angle in relation to the base portion 98. The positioning points hold the upper portion 102 in respective positions between about 0 degrees and about 180 degrees in relation to the base portion 98.

At least one adjustable front hinge 110 allows for similar angular adjustment of the bottom portion 104. The adjustable front hinge 110 also has a plurality of positioning points 110A. Each positioning point 110A holds the bottom portion 104 at a respective angle in relation to the base 98. The positioning points hold the bottom portion 104 in respective positions between about 180 degrees and about 360 degrees in relation to said base.

The embodiment of FIG. 7 includes an adjustable foot rest 112 and an extension device 114. The bottom portion 104, the foot rest 112, and the extension device 114 may be designed to incorporate any or all of the features and functions previously discussed in relation to the embodiments of FIGS. 1-6. The features of the foot rest 112 and the extension device 114 will not be repeated herein, but are incorporated as if set forth in full.

One goal of the invention is to assist a user in positioning a child safety seat to the most comfortable angle for extended periods of riding. FIGS. 1-7 show a support apparatus for receiving the child safety seat on a base portion and an upper portion. The support apparatus described herein, however, may be designed to work equally well with a child safety seat adapted to receive only the bottom portion 14 or 104 to support the desirable angle of the child safety seat.

Figure 8:
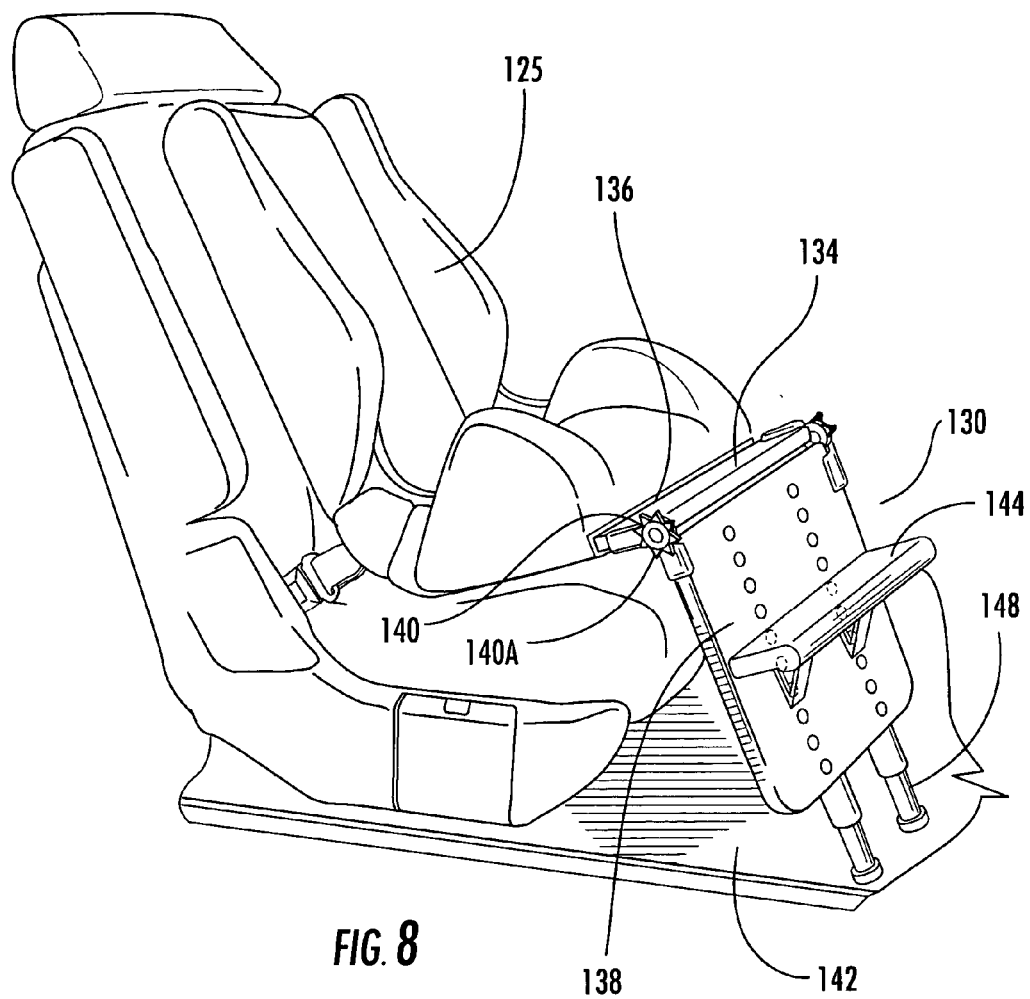
FIG. 8 is a side view of a child safety seat adapted to receive a child safety seat support apparatus with an adjustable hinge as shown.

FIG. 8 shows one configuration of a safety seat 125 adapted to receive a support apparatus 130. The support apparatus 130 has at least one projection end 134 for sliding into a receiving cavity 136 within the child safety seat 125. A floor brace 138 is connected to the projection end 134 by at least one adjustable hinge 140. The floor brace of FIG. 8 may include all of the features and functions of the bottom portions described previously. As such, those features will not be repeated. In an alternative embodiment, the floor brace 138 may be attached to the safety seat in a fixed position without the hinge 140.

The floor brace 138 engages the vehicle floor 142. The floor brace 138 provides an upward directed force vector against which the safety seat 125 bears downward. The upward directed force of the floor brace 138 allows the user to select an angle at which the child safety seat securely reclines.

As in the other embodiments of this invention, a foot rest 144 extends from floor brace 138. The foot rest 144 includes all of the features described for previously discussed foot rests 24 or 112. As such, these features will not be repeated herein but are fully incorporated by reference.

The floor brace 138 is connected to the projection end 134 by an adjustable hinge 140. As previously described, adjustable hinges are well known in the art. A ratchet type mechanism allows the adjustable hinge 140 to be locked in a plurality of selectable positions. The adjustable hinge 140 of FIG. 8, therefore, has a plurality of positioning points 140A that hold the floor brace 138 at a respective angle in relation to the projection end 134. As in prior embodiments, the positioning points hold the floor brace in a selected position between about 180 degrees and about 360 degrees in relation to the projection end 134.

The support apparatus 130 of FIG. 8 holds a child safety seat 125 in a desirable tilting position by engaging both the safety seat 125 and the floor 142 of the vehicle. The floor brace 138 may include an extension device 148 to allow adjustment between the floor brace 138 and the floor 142. The extension device 148 of FIG. 8 includes all of the features and functions of the extension devices 32, 48, 77, 114 discussed above. As such, the details of the extension device 148 will not be repeated for the support apparatus of FIG. 8.

Without limiting the invention, another goal of the support apparatuses of FIGS. 1-8 is to provide overall positioning capabilities to child safety seats in accordance with the invention herein. Each feature of this invention, as described above, may be incorporated into an overall safety seat.

A safety seat according to this embodiment would not need a separate support apparatus as described and claimed herein. Instead, the features and functionality of the support apparatus 5, 95, 130 may be part of the safety seat itself. In this regard, and for example only, a safety seat would have seat, back, and foot portions corresponding to the respective base portion 8, the upper portion 13, and the bottom portion 14. All of the comfort and safety features of a standard child safety seat would then be available with the added feature of tilt adjustment. A child safety seat according to this invention would be angularly adjustable and include a foot rest for added functionality. Allowing a child safety seat to engage the floor of a vehicle is also desirable to add stability to the child safety seat installation.

In the drawings and the specification, typical embodiments of the invention have been disclosed. Specific terms have been used only in a generic and descriptive sense, and not for purposes of limitation. The inventor is not acting as a lexicographer, and terms herein are intended to have their ordinary meaning. The invention is not restricted to the slavish imitation of each and every detail set forth above. Obviously, devices may be provided which change, eliminate, or add certain specific details without departing from the scope of the invention. The scope of the invention is set forth in the following claims.

The invention claimed is:

1. A child safety seat support apparatus, comprising:
a base portion for receiving a child safety seat thereon, said base portion having a first end and a second end opposite said first end;
an upper portion connected to said first end and extending upward at an angle relative to said base portion; and
a bottom portion connected to said second end and extending downward at an angle relative to said base portion, said bottom portion engaging the floor of a vehicle; and
a foot rest extending from said bottom portion;
wherein said foot rest comprises at least one gusset connected under a respective end of said foot rest to support said foot rest against said bottom portion;
wherein said base, said upper portion, and said bottom portion adjust the position in which a child safety seat reclines thereon.

2. The apparatus according to claim 1, wherein said upper portion is connected to said first end at an angle less than about 180 degrees relative to said base portion.

3. The apparatus according to claim 1, wherein said bottom portion is connected to said second end at an angle of between about 180 degrees and about 360 degrees relative to said base portion.

4. The apparatus according to claim 1, further comprising means for removably attaching said foot rest to said bottom portion.

5. The apparatus according to claim 4, wherein said means for removably attaching said foot rest comprises a plurality of inner edges defining attachment receptacles within said bottom portion for engaging said foot rest therein.

6. The apparatus according to claim 1, wherein each of said gussets comprises at least one gusset fastener for engaging at least one of the attachment receptacles.

7. The apparatus according to claim 5, wherein said inner edges are vertically spaced from one another to provide attachment receptacles at a plurality of heights along said bottom portion.

8. The apparatus according to claim 7, wherein said bottom portion comprises an extension device connected to said bottom portion by means for coarse adjustment of the length of said extension device.

9. The apparatus according to claim 8, wherein said means for coarse adjustment of the length of said extension device comprises an adjustable fastener releasably connected to an attachment receptacle within said bottom portion at one of the plurality of available heights along said bottom portion.

10. The apparatus according to claim 8, wherein said bottom portion comprises a front face and a rear face connected by two side faces, a top face, and a bottom face to define a cavity therein, wherein said bottom face has at least one opening for sliding the extension device into the cavity of said bottom portion, wherein said front face and said rear face comprise a plurality of inner edges defining pairs of coaxial holes at a plurality of heights, and wherein said extension device comprises a pair of coaxial spring pins that releasably engage a pair of coaxial holes within said bottom portion to lock said extension device in place within said bottom portion.

11. The apparatus according to claim 8, wherein said extension device comprises means for fine adjustment of the length of said extension device.

12. The apparatus of claim 11, wherein said means for fine adjustment comprises a threading from the bottom of said extension device into the interior of said extension device and a length adjustment screw engaging said threading to brace said extension device against a vehicle floor.

13. The apparatus according to claim 1, wherein said bottom portion comprises at least one leg.

14. The apparatus according to claim 13, wherein said leg is hollow to define a cavity therein.

15. The apparatus according to claim 1, wherein said base and said upper portion are contoured to permit access to child safety seat anchors within a vehicle seat.

16. A child safety seat support apparatus, comprising:
a base portion for receiving a child safety seat thereon, said base portion having a first end and a second end opposite said first end;
an upper portion connected to said first end and extending upward at an angle relative to said base portion; and
a bottom portion connected to said second end and extending downward at an angle relative to said base portion, said bottom portion engaging the floor of a vehicle;
a foot rest extending from said bottom portion, said foot rest comprising a means for removably attaching said foot rest to said bottom portion; and
at least one gusset connected under said footrest to support said footrest against said bottom portion,
wherein said bottom portion comprises an extension device connected to said bottom portion by a means for coarse adjustment of the length of said extension device;
wherein said base, said upper portion, and said bottom portion adjust the position in which a child safety seat reclines thereon.

17. The apparatus according to claim 16, wherein said upper portion is connected to said first end at an angle less than about 180 degrees relative to said base portion.

18. The apparatus according to claim 16, wherein said bottom portion is connected to said second end at an angle of between about 180degrees and about 360 degrees relative to said base portion.

19. The apparatus according to claim 16, wherein said means for removably attaching said foot rest comprises a plurality of inner edges defining attachment receptacles within said bottom portion for engaging said foot rest therein.

20. The apparatus according to claim 19, wherein said inner edges are vertically spaced from one another to provide attachment receptacles at a plurality of heights along said bottom portion.

21. The apparatus according to claim 16, wherein said means for coarse adjustment of the length of said extension device comprises an adjustable fastener releasably connected to an attachment receptacle within said bottom portion at one of the plurality of available heights along said bottom portion.

22. The apparatus according to claim 16, wherein said extension device comprises a means for fine adjustment of the length of said extension device.

23. The apparatus of claim 22, wherein said means for fine adjustment comprises a threading from the bottom of said extension device into the interior of said extension device and a length adjustment screw engaging said threading to brace said extension device against a vehicle floor.

24. The apparatus according to claim 16, wherein said bottom portion comprises at least one leg.

25. The apparatus according to claim 16, wherein said leg is hollow to define a cavity therein.

26. The apparatus according to claim 16, wherein said base and said upper portion are contoured to permit access to child safety seat anchors within a vehicle seat.

27. A child safety seat support apparatus, comprising:
a base portion for receiving a child safety seat thereon, said base portion having a first end and a second end opposite said first end;
an upper portion connected to said first end and extending upward at an angle relative to said base portion; and
a bottom portion connected to said second end and extending downward at an angle relative to said base portion, said bottom portion engaging the floor of a vehicle;
a foot rest extending from said bottom portion;
at least one gusset connected under said footrest to support said footrest against said bottom portion; and
an extension device connected to said bottom portion for adjusting the downward extending length of said bottom portion;
wherein said bottom portion comprises a front face and a rear face connected by two side faces, a top face, and a bottom face to define a cavity therein;
wherein said bottom face has at least one opening for sliding said extension device into the cavity of said bottom portion, wherein said front face and said rear face comprise a plurality of inner edges defining pairs of coaxial holes at a plurality of heights, and wherein said extension device comprises a pair of coaxial spring pins that releasably engage a pair of coaxial holes within said bottom portion to lock said extension device in place within said bottom portion; and,
wherein said base, said upper portion, and said bottom portion adjust the position in which a child safety seat reclines thereon.

28. The apparatus according to claim 27, wherein said upper portion is connected to said first end at an angle less than about 180 degrees relative to said base portion.

29. The apparatus according to claim 27, wherein said bottom portion is connected to said second end at an angle of between about 180 degrees and about 360 degrees relative to said base portion.

30. The apparatus according to claim 27, further comprising a means for removably attaching said foot rest to said bottom portion.

31. The apparatus according to claim 30, wherein said means for removably attaching said foot rest comprises a plurality of inner edges defining attachment receptacles within said bottom portion for engaging said foot rest therein.

32. The apparatus according to claim 31, wherein said inner edges are vertically spaced from one another to provide attachment receptacles at a plurality of heights along said bottom portion.

33. The apparatus according to claim 27, wherein said extension device is connected to said bottom portion by means for coarse adjustment of the length of said extensio fastener for engaging at least one of device.

34. The apparatus according to claim 33, wherein said means for coarse adjustment of the length of said extension device comprises an adjustable fastener releasably connected to an attachment receptacle within said bottom portion at one of the plurality of available heights along said bottom portion.

35. The apparatus according to claim 34, wherein said extension device comprises a means for fine adjustment of the length of said extension device.

36. The apparatus of claim 35, wherein said means for fine adjustment comprises a threading from the bottom of said extension device into the interior of said extension device and a length adjustment screw engaging said threading to brace said extension device against a vehicle floor.

37. The apparatus according to claim 27, wherein said bottom portion comprises at least one leg.

38. The apparatus according to claim 37, wherein said leg is hollow to define a cavity therein.

39. The apparatus according to claim 27, wherein said base and said upper portion are contoured to permit access to child safety seat anchors within a vehicle seat.

* * * * *

UNITED STATES PATENT AND TRADEMARK OFFICE
CERTIFICATE OF CORRECTION

| | |
|---|---|
| PATENT NO. | : 7,464,990 B2 |
| APPLICATION NO. | : 10/892703 |
| DATED | : December 16, 2008 |
| INVENTOR(S) | : Constantine Dean Paul Collias |

It is certified that error appears in the above-identified patent and that said Letters Patent is hereby corrected as shown below:

In the Claims:

Column 12, line 63 claim 33 reads:   means for coarse adjustment of the length of said ~~extensio~~
Column 12, line 64 claim 33 reads:   ~~fastener for engaging at least one of~~ device Column 12, lines 63 and 64 claim 33 & claim 34 should read:   means for coarse adjustment of the length of said extension device.

Signed and Sealed this

Nineteenth Day of May, 2009

JOHN DOLL
*Acting Director of the United States Patent and Trademark Office*